US009210358B2

(12) United States Patent
Griffin (10) Patent No.: US 9,210,358 B2
(45) Date of Patent: *Dec. 8, 2015

(54) DUAL-MODE COMMUNICATION DEVICES AND METHODS FOR COMMUNICATING WITH AN ENTERTAINMENT SYSTEM

(71) Applicant: Kevin Griffin, Sammamish, WA (US)

(72) Inventor: Kevin Griffin, Sammamish, WA (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/934,035

(22) Filed: Jul. 2, 2013

(65) Prior Publication Data

US 2014/0004843 A1    Jan. 2, 2014

Related U.S. Application Data

(60) Provisional application No. 61/667,261, filed on Jul. 2, 2012, provisional application No. 61/675,211, filed on Jul. 24, 2012, provisional application No. 61/682,668, filed on Aug. 13, 2012.

(51) Int. Cl.
| | |
|---|---|
| *H04M 3/00* | (2006.01) |
| *H04N 5/44* | (2011.01) |
| *H04W 88/06* | (2009.01) |
| *A63F 13/30* | (2014.01) |
| *G02C 11/00* | (2006.01) |

(Continued)

(52) U.S. Cl.
CPC .............. *H04N 5/4403* (2013.01); *A63F 13/12* (2013.01); *G02C 11/10* (2013.01); *H04N*

(Continued)

(58) Field of Classification Search
CPC .... H04W 88/06; H04W 88/02; H04B 1/3827; H04N 21/4126; H04N 21/64322; H04N 21/43637; H04N 21/6125; H04N 21/42202; H04N 21/4781; H04N 21/4122; H04N 21/482; H04N 5/4403; H04N 21/613; A63F 13/12; A63F 2300/204; A63F 2300/538; A63F 2300/534; A63F 13/355; A63F 13/358; A63F 13/92; G02C 11/10

See application file for complete search history.

(56) References Cited

U.S. PATENT DOCUMENTS

| | | | | |
|---|---|---|---|---|
| 6,895,255 | B1 * | 5/2005 | Bridgelall | 455/552.1 |
| 2004/0259537 | A1 * | 12/2004 | Ackley | 455/420 |

(Continued)

*Primary Examiner* — Ajit Patel
(74) *Attorney, Agent, or Firm* — Ellen M. Bierman; Lowe Graham Jones PLLC (57) ABSTRACT

Methods, systems, and techniques for dual-mode communication are provided. Example embodiments provide a an enhanced mobile device that includes a CPU, a low latency transceiver, and a high latency transceiver. The enhanced mobile device is in communication with a console via both the low latency transceiver and the high latency transceiver. The console also includes a CPU, a low latency transceiver, and a high latency transceiver. In some embodiments, the low latency communication channel is used to transmit control messages to an entertainment console whereas the high latency communication channel is used to communicate data between the mobile device and the entertainment console. The dual-mode communication may be used in different scenarios, including with an entertainment console for gaming, viewing videos, and the like.

28 Claims, 8 Drawing Sheets

(51) Int. Cl.
*H04N 21/41* (2011.01)
*H04N 21/422* (2011.01)
*H04N 21/4363* (2011.01)
*H04N 21/478* (2011.01)
*H04N 21/482* (2011.01)
*H04N 21/643* (2011.01)
*H04N 21/61* (2011.01)

(52) U.S. Cl.
CPC  *21/4122* (2013.01); *H04N 21/4126* (2013.01); *H04N 21/42202* (2013.01); *H04N 21/43637* (2013.01); *H04N 21/4781* (2013.01); *H04N 21/482* (2013.01); *H04N 21/6125* (2013.01); *H04N 21/6137* (2013.01); *H04N 21/64322* (2013.01); *H04W 88/06* (2013.01); *A63F 2300/204* (2013.01); *A63F 2300/534* (2013.01); *A63F 2300/538* (2013.01)

(56) References Cited

U.S. PATENT DOCUMENTS

| | | | |
|---|---|---|---|
| 2007/0099703 A1* | 5/2007 | Terebilo | 463/42 |
| 2008/0039089 A1* | 2/2008 | Berkman et al. | 455/436 |
| 2009/0258672 A1* | 10/2009 | Camp et al. | 455/553.1 |
| 2009/0305789 A1 | 12/2009 | Patil | |
| 2010/0329491 A1* | 12/2010 | Johansen | 381/315 |
| 2011/0001808 A1 | 1/2011 | Mentz et al. | |
| 2011/0319073 A1* | 12/2011 | Ekici et al. | 455/426.1 |
| 2012/0094757 A1 | 4/2012 | Vago et al. | |
| 2012/0170521 A1* | 7/2012 | Vogedes et al. | 370/329 |
| 2012/0309388 A1* | 12/2012 | Moosavi et al. | 455/426.1 |
| 2013/0231105 A1* | 9/2013 | Bai et al. | 455/426.1 |

\* cited by examiner

3100: A process for interacting with an entertainment console

3101: facilitating interaction with the entertainment console via a mobile telephone that includes a low latency transmitter communicatively coupled to the entertainment console and a high latency transceiver communicatively coupled to the entertainment console, by:

3102: transmitting control messages to the entertainment console via the low latency transmitter 3103: communicating data messages with the entertainment console via the high latency transceiver

Fig. 3.2

3200: The process of 3100, wherein the facilitating interaction includes playing an interactive video game executing on the entertainment console by:

3201: transmitting gaming control messages via the low latency transmitter, wherein the low latency transmitter is a 2.4 GHz transmitter having a maximum range of 10 meters and a latency of less than 10 milliseconds 3202: receiving gaming data via the high latency transceiver, wherein the high latency transceiver communicates using IP packets via a Wi-Fi or cellular network

Fig. 3.3

3300: The process of 3100, wherein the facilitating interaction includes viewing a video program received by the entertainment console, by:

> 3301: transmitting program selection and control messages via the low latency transmitter, wherein the low latency transmitter is a 2.4 GHz transmitter having a maximum range of 10 meters and a latency of less than 10 milliseconds > 3302: receiving program video data, program audio data, and/or program metadata via the high latency transceiver, wherein the high latency transceiver communicates using IP packets via a Wi-Fi or cellular network > 3303: presenting at least some of the program video data via a display of the mobile telephone

Fig. 3.4

3400: The process of 3100, further comprising:

> 3401: automatically selecting one of the low latency transmitter or the high latency transceiver for communication with the entertainment console, based on the type or amount of data being communicated between the mobile telephone and the entertainment console

*Fig. 3.5*

3500: The process of 3100, wherein the low latency transmitter is a first low latency transmitter and the mobile telephone includes a second low latency transmitter, and further comprising:

3501: automatically determining to communicate via the second low latency transmitter instead of the first low latency transmitter, based in part on the amount of data being communicated between the mobile telephone and the entertainment console via the first low latency transmitter

DUAL-MODE COMMUNICATION DEVICES AND METHODS FOR COMMUNICATING WITH AN ENTERTAINMENT SYSTEM

TECHNICAL FIELD

The present disclosure relates to methods, techniques, devices, and systems for interacting with an entertainment system and, more particularly, to methods, techniques, devices, and systems for interacting with an entertainment console using a dual-mode communication device.

BRIEF DESCRIPTION OF THE DRAWINGS

FIGS. 3.1-5 are example flow diagrams of processes performed by example embodiments.

DETAILED DESCRIPTION

The current mobile device environment lacks any kind of fast/low latency wireless connection to entertainment systems, such as gaming consoles, set-top boxes, or the like. This deficiency stands in the way of the goal of providing a seamless wireless connected experience between smart phones (and other mobile devices) and home entertainment systems. Latency is a measure of time delay experienced in a communication system. Latency may be measured as the time from the beginning of a transmission (e.g., a signal, packet, etc.) to the beginning of the reception of the transmission. Latency is related to response time, as a low latency connection will typically result in a lower response time and thus more interactivity. Accordingly, low latency connections are typically used or preferred where fast, highly interactive control is critical, like in a game controller. But low latency connections may have lower range (e.g., 2.4 GHz and/or Bluetooth) and/or provide less bandwidth to transmit or receive data. High bandwidth data connections, like Wi-Fi, have greater latency and do not work effectively when employed in scenarios where a game controller would be used because of the much greater latency. Higher bandwidth connections may be utilized where the amount or volume of data being sent is larger, as in megabytes, and gigabytes, but not needing low latency/faster response times.

The techniques described herein are based on dual-mode console/device communication. In some embodiments, a mobile device (e.g., a smart phone, tablet computer, smart glasses) is enhanced and/or configured to include a low latency transmitter and a high latency transceiver. The enhanced mobile device can then be used to transmit via the low latency transmitter control signals (e.g., gaming commands such as up/down, left/right) to an entertainment console (e.g., a game system, set-top box). Typically, the low latency transceiver is short range and low bandwidth, such as 2.4 Ghz game controller communication protocols, Bluetooth, infrared, or the like. Note that in some embodiments, the low latency transmitter may be, or be part of, a low latency transceiver, such that bidirectional low-latency communication with the console is possible. However, it is not necessary for the enhanced mobile device to have the capability to receive data over a low latency connection.

In general, a low latency communication includes any connection having a latency that is low enough to support a particular interactive gaming or entertainment experience. Thus, "low latency" may depend in part on the application or setting. For an interactive, real-time video game, a latency of up to 40 ms may be acceptable (while some games and users may require even lower latencies, such as 10 ms, 15 ms, 20 ms, or the like). For channel surfing or menu navigation, a latency of between 50 and 100 ms may be acceptable to provide an interactive experience. In addition, latency may be measured with respect to the communication link (e.g., the time taken for the first bit of data to arrive at the receiver), while excluding processing time by the application. If such a measurement is used, then a lower latency connection may be required, to account for application processing time. Thus, if the application processing time is 20 ms, then a maximum acceptable latency of the communication link may be lower (e.g., 20 ms to yield a total latency of 40 ms that includes application processing time of 20 ms).

Concurrently, the mobile device can communicate data (e.g., game data, image data, video data, audio data) with the entertainment console via the high latency transceiver. Typically, the high latency transceiver provides higher bandwidth than the low latency transmitter. For example, the high latency transceiver may communicate via IP over a Wi-Fi, 3G, or 4G (e.g., LTE) connection.

Using the described techniques, seamless entertainment becomes possible between a mobile device and a console. The techniques can provide experiences such as playing the same game on both a console and smart phone, controlling streaming movies on a TV from a smart phone, and transferring movies from a TV to a smart phone (and vice versa) midstream, and the like.

Note that many of the examples herein are based on a mobile device that is a smart phone enhanced to perform dual-mode communication. However, in other embodiments, other mobile devices may be similarly enhanced. Other example mobile devices include, but are not limited to, tablet computers, eBook readers, smart glasses (e.g., eyeglasses or goggles that include a display mechanism), and display-enabled helmets.

Introduction & Overview

Figure 1:
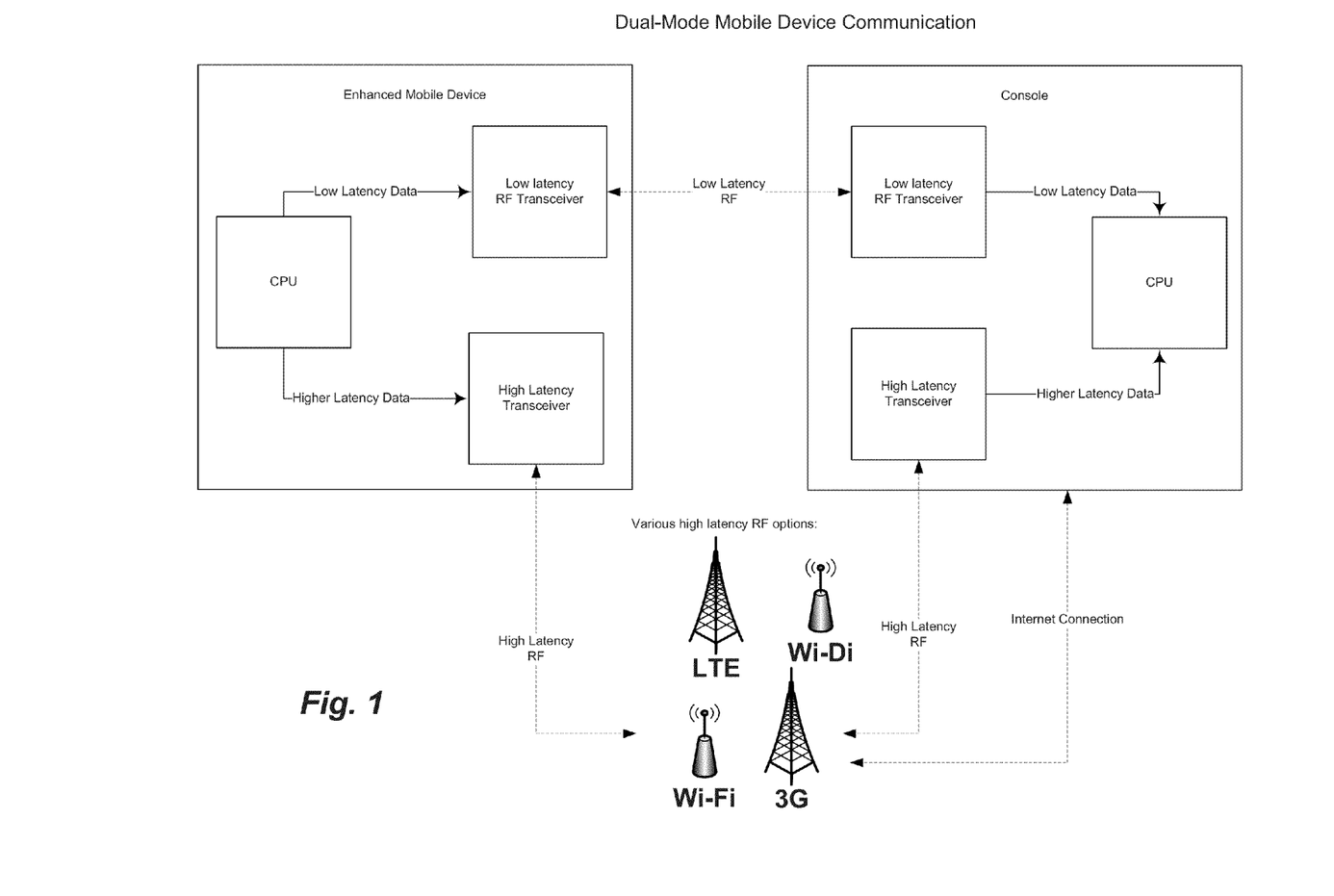
FIG. 1 is an example block diagram illustrating dual-mode communication according to an example embodiment.

FIG. 1 is an example block diagram illustrating dual-mode communication according to an example embodiment. FIG. 1 illustrates an enhanced mobile device that includes a CPU, a low latency transceiver, and a high latency transceiver. The enhanced mobile device is in communication with a console via both the low latency transceiver and the high latency transceiver. The console also includes a CPU, a low latency transceiver, and a high latency transceiver. Note that in some embodiments, the low latency communication between the enhanced mobile device and the console is one-way or unidirectional. That is, the enhanced mobile device may only be able to transmit to (and not receive from) the console via the low latency communication connection/link. Furthermore, the low latency connection may not rely on handshaking or similar operations, such as may be required to set up or tear down a TCP/IP connection.

Dual-mode wireless communication according to some embodiments includes at least some of the following features:
Utilize existing console 2.4 GHz wireless connection or Bluetooth schema for control commands Typical control commands may include existing console controller commands such as: dual analog stick movement (up/down, left right, push), d-pad (8 way digital control pad), action input buttons, adjustable analog triggers, start and back buttons, power or command button.

Device control commands, sensors, or input devices become available to the console. These console control commands may include: smart phone touch screen and (soft) keyboard inputs, tilt, bank, motion (e.g., accelerometer, magnetometer, gyroscope), compass/direction, GPS/AGPS, camera aiming. Also, future device control commands similar to Microsoft's Kinect sensor could be built into a device for 3D gaming.

Feedback from the console sent back to the enhanced mobile device over the low latency connection may include low response time feedback such as a vibration signal sent to the device (e.g., to signal when the user collides with an object in a driving game).

Utilize Wi-Fi, 3G, 4G (e.g., LTE), or future data connections for high bandwidth data transfer.

Example uses for data transfer include: 2nd (or 3rd, 4th, etc.) screen display for a game being played where the 1st screen may be a TV connected to a console (or vice versa), metadata relevant to a game being played on the main console connected TV, soft controls (graphically display on the device screen) that change relevant to a level of a game, options available at certain points in a game, a game map that updates as the player moves, metadata relevant to a movie or other video program being watched on the main screen, mobile user profile storage, and also used to map an area around the user by utilizing the device camera to input the visual setting around the user. Voice commands or other input can also be transferred via data to the console.

In some embodiments, low latency communication is provided via a 2.4 GHz and/or Bluetooth connection schema or protocol. For example, in the case of Microsoft Xbox 360, a proprietary 2.4 GHz game controller protocol is used. For Nintendo Wii and Sony PS3 consoles, Bluetooth is utilized. The term "Bluetooth" may include current and future versions of the proprietary open protocol for creating short range personal area networks, communicating in the 2.4-2.48 GHz range, using frequency hopping spread spectrum techniques utilizing 79 channels of 1 MHz each. In some cases error checking (e.g., Extended Synchronous Connections) may be utilized, although in some embodiments some error checking protocols may not be used to reduce latency.

Some embodiments include multiple low latency transmitters (or transceivers). For example, the enhanced mobile device may include both a Bluetooth transceiver and an infrared transmitter. In such cases, the enhanced device may include logic to determine which of the multiple transmitters to use. For example, the enhanced device may preferentially utilize one transmitter until it has reached or is near its capacity, and then transmit overflow data via the other transmitter. As another example, the enhanced device may seek to divide or balance the transmission load between the two (or more) transmitters. In some embodiments, the choice of transmitter to use may be exposed to the game application or other software, so that an application developer may control which transmitter to use.

In some embodiments, control commands (and other signals, messages, or data needing a low latency connection) are separated from more data intensive examples (mentioned above) by logic executing on the CPU. Control commands are converted to protocol format for transfer across the 2.4 GHz game controller or Bluetooth band. The enhanced mobile device then employs its 2.4 GHz game controller or Bluetooth transmitter to send a signal in the protocol format specified. On the other end, the console receiver receives radio waves emitted by device receiver and the data in protocol is converted by CPU to perform commands with respect to an application or other function/code performed by the console. In reverse, if the console needs to send fast, low latency data to the enhanced mobile device, it can do so over the same connection as both the device and console may have transmit and receive functionality.

In some embodiments, when the enhanced mobile device or console CPU determines or identifies data that is of a non-control type suitable for transmission by a higher latency, higher bandwidth connection like Wi-Fi, LTE, or 3G, (or a future high bandwidth data connections), it converts the data to the specified protocol format required for transfer across the higher bandwidth connection. This higher bandwidth data is received by the corresponding high latency receiver and employed to perform higher bandwidth, higher latency activities of the type described above.

Figure 2A:
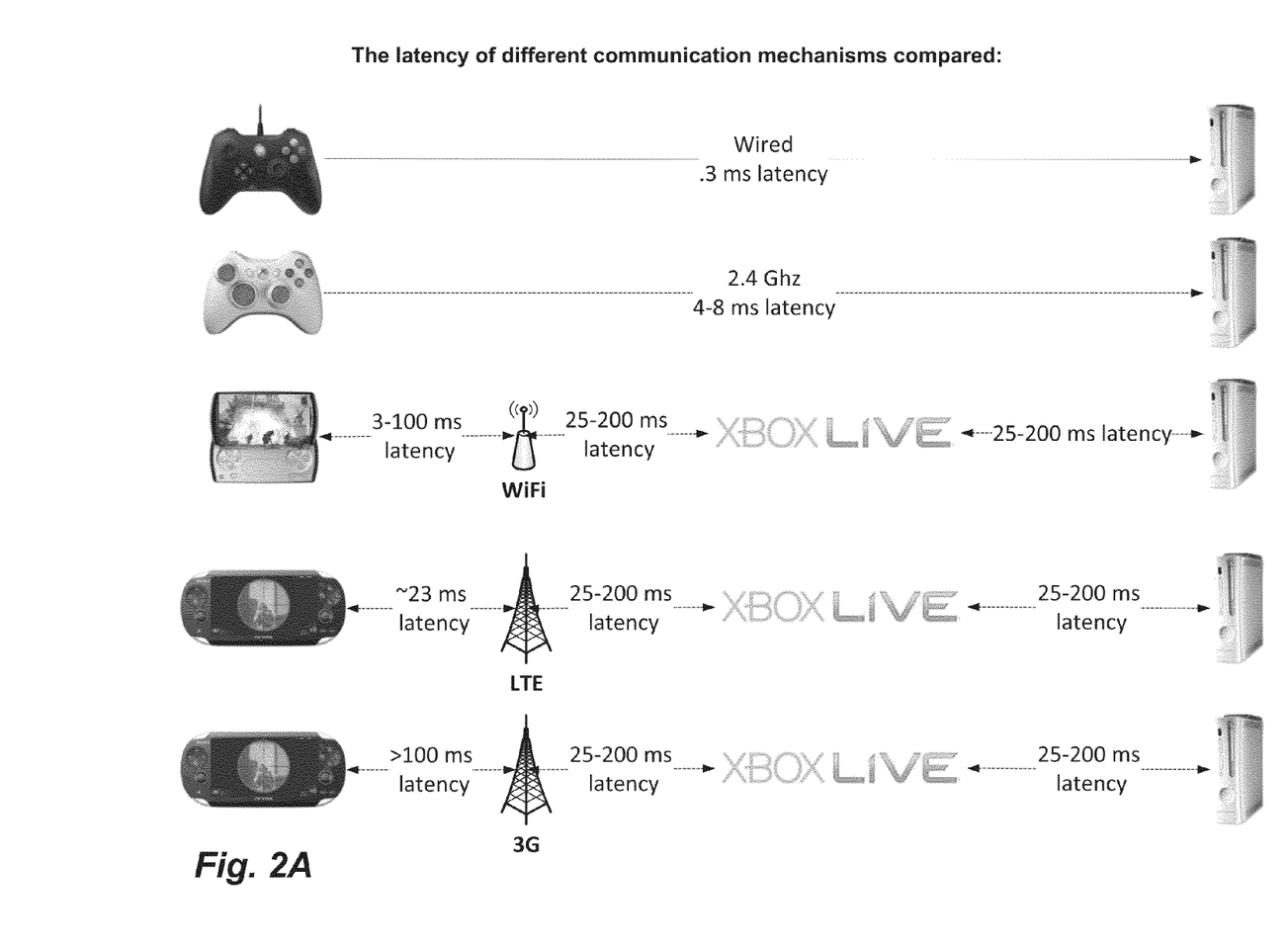
FIG. 2A compares latency of various communication mechanisms.

FIG. 2A compares latency of various communication mechanisms. In particular, FIG. 2A compares the latency of example wire-based communication between a game controller and a game console (0.3 ms) and example direct 2.4 GHz wireless communication between a game controller and a game console (4-8 ms). While the latency of direct wireless communication is greater than that of wire-based communication, it is still low enough to play highly interactive video games.

FIG. 2A also compares the latency of various indirect, high latency communication approaches between a mobile device (e.g., smart phone) and a game console. The compared approaches all utilize a Wi-Fi or cellular network in addition to various intermediary devices (e.g., a wireless router) or systems (e.g., cellular network). In particular, FIG. 2A compares the latency of communication between a mobile device and a game console via a Wi-Fi network, an LTE network, and a 3G network. In this example, Wi-Fi provides the lowest latency of the three approaches—about 53 ms in the best case (the sum of 3 ms from smart phone to wireless router, 25 ms from router to intermediary system, 25 ms from intermediary system to game console). However, this best-case latency far exceeds that required to provide an enjoyable interactive gaming experience.

Figure 2B:
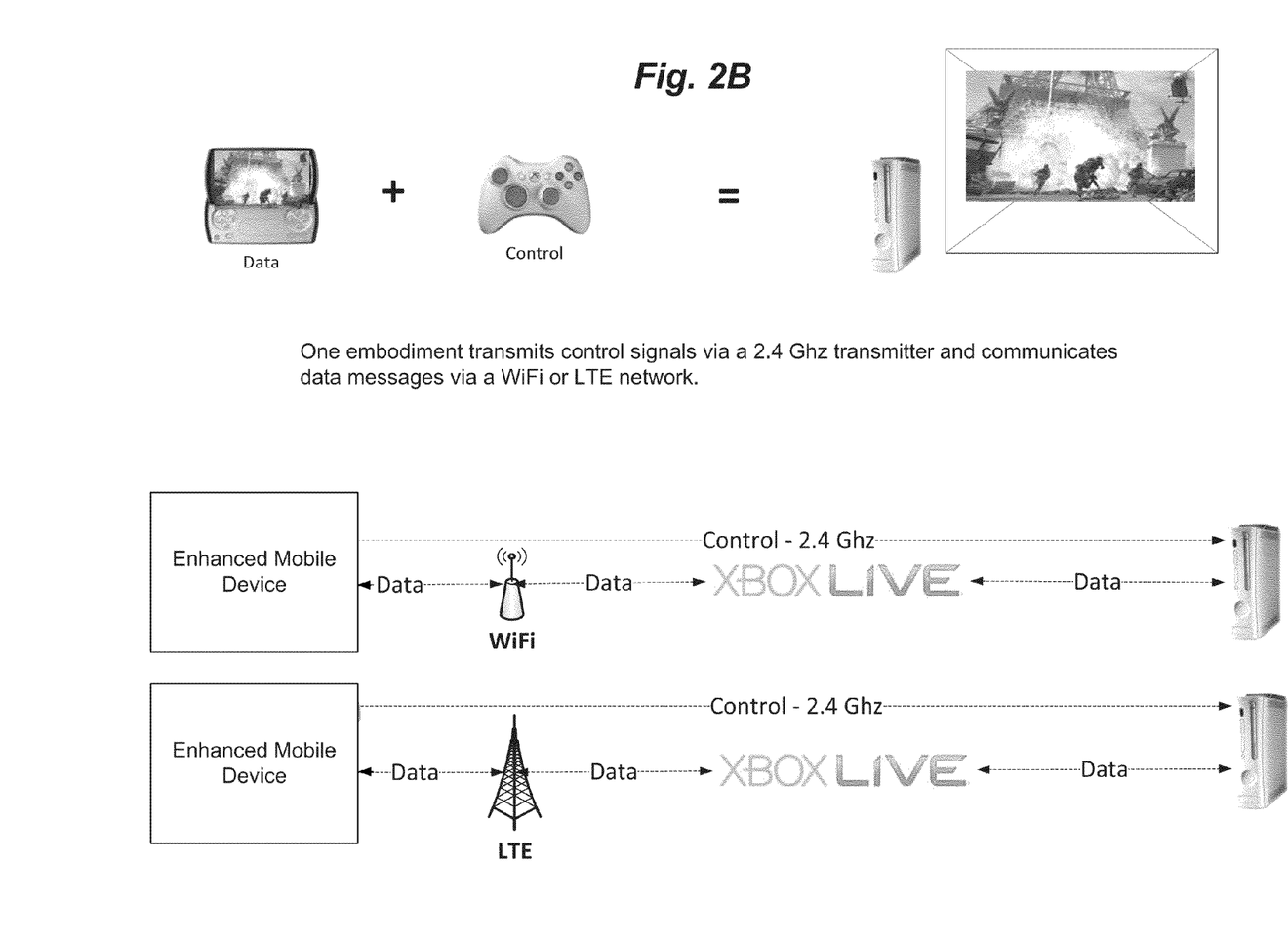
FIG. 2B illustrates a combination of low and high latency communication according to an example embodiment.

FIG. 2B illustrates a combination of low and high latency communication according to an example embodiment. FIG. 2B shows how low and high latency communication may be combined in example embodiments. In particular, low latency control-oriented communication is performed via a 2.4 GHz mechanism, and high latency data-oriented communication is performed via a Wi-Fi or LTE network. By incorporating both communication mechanisms in a single enhanced mobile device, the enhanced mobile device may be employed to provide an enjoyable, interactive gaming or viewing experience.

Figure 2C:
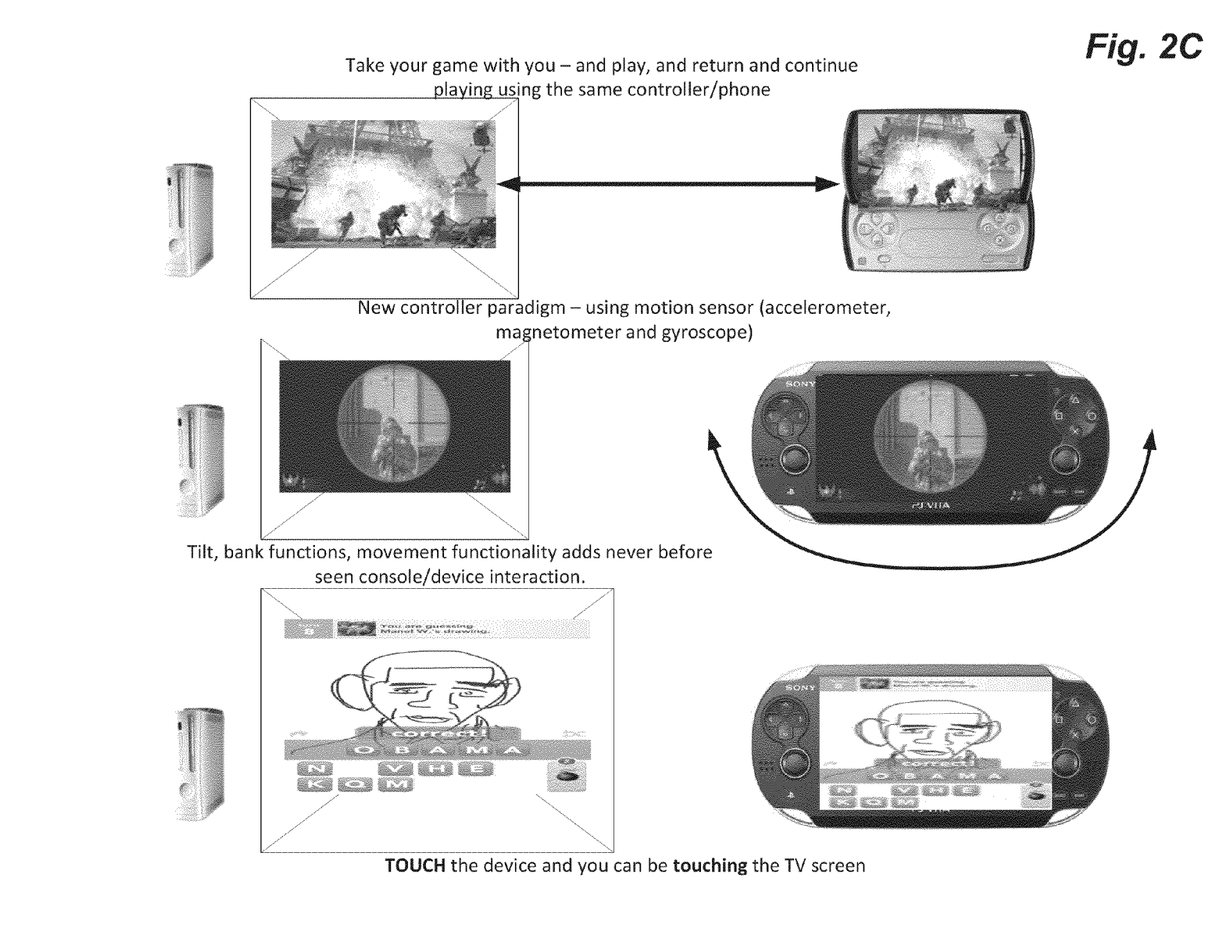
FIG. 2C illustrates advanced gaming scenarios facilitated via dual-mode communication according to an example embodiment.

FIG. 2C illustrates advanced gaming scenarios facilitated via dual-mode communication according to an example embodiment. In particular, FIG. 2C illustrates game or program portability, new controller paradigms (e.g., using advanced sensors of mobile devices, such as accelerometers and gyroscopes), and remote touch screens (e.g., touching a screen of a mobile device is translated to a "touch" or input to a remote television or other display).

The described techniques may bring a new level of precision and accuracy to gaming applications. Current tilt-based gaming uses only the accelerometer, resulting in an imprecise record of motion, which while still fun, is noticeably coarse in the level of control afforded. However, with the addition of a gyroscope together with high-precision sensor fusion and calibration, games can be controlled in a more precise and granular fashion, enabling more advanced tilt- and twist-based games. This has proved popular with both advanced and casual golfers, as advanced motion can track the speed and arc of your swing, as well as the angle of the club face, and is therefore able to provide a very accurate replication of your golf shot, with distance, elevation hook and slice all accounted for accurately. In addition, advanced motion technology can enable your phone to be used to control game consoles and other gaming devices.

Example Processes

FIGS. 3.1-5 are example flow diagrams of processes performed by example embodiments. The following flow diagrams illustrate facilitating interaction with an entertainment console using concurrent communication via a dual mode communication system.

Figure 31:
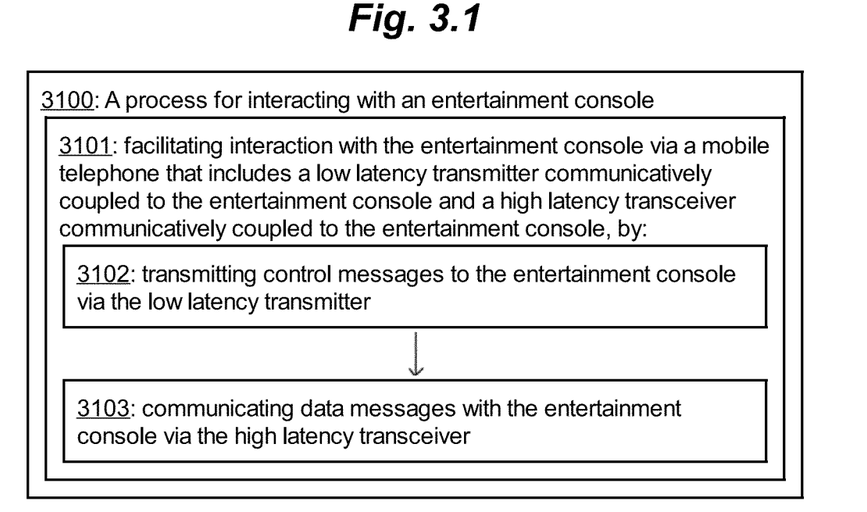

FIG. 3.1 is an example flow diagram of example logic for interacting with an entertainment console. The illustrated logic in this and the following flow diagrams may be performed by, for example, the mobile device 400 described with respect to FIG. 4, below. More particularly, FIG. 3.1 illustrates a process 3100 that includes operations performed by or at the following block(s).

At block 3101, the process performs facilitating interaction with the entertainment console via a mobile telephone that includes a low latency transmitter communicatively coupled to the entertainment console and a high latency transceiver communicatively coupled to the entertainment console, by: performing operation(s) of block(s) 3102 and 3103, described below.

At block 3102, the process performs transmitting control messages to the entertainment console via the low latency transmitter. Transmitting control messages may include transmitting any message, signal, or data that controls the operation of the entertainment console or some function or application being performed thereby. For example, a control message may be a game control signal, such as up/down or left/right. In some embodiments, if there is available bandwidth on the low latency connection, the process may elect to communicate other information or data via this connection.

At block 3103, the process performs communicating data messages with the entertainment console via the high latency transceiver. Data messages may include game data including image or audio data. In other embodiments, data messages may include video, audio, or metadata that is related to a video program being viewed via the entertainment console.

Figure 32:
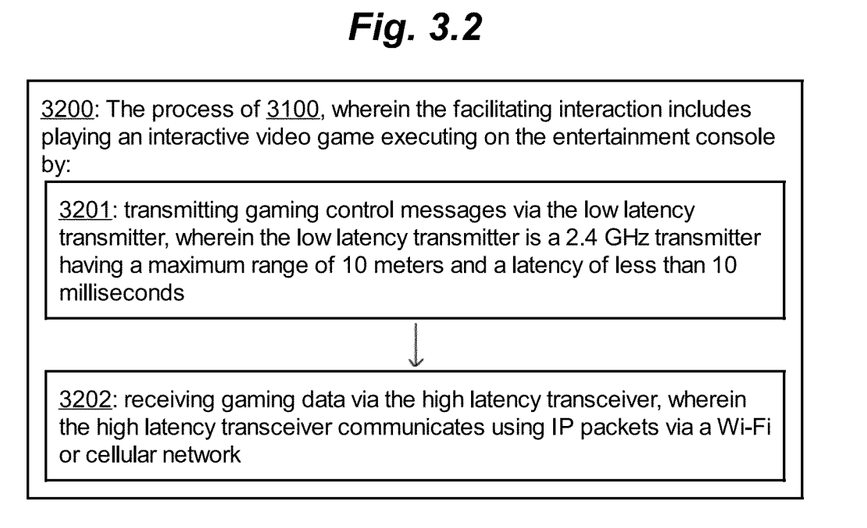

FIG. 3.2 is an example flow diagram of example logic illustrating an example embodiment of process 3100 of FIG. 3.1. More particularly, FIG. 3.2 illustrates a process 3200 that includes the process 3100, wherein the facilitating interaction includes playing an interactive video game executing on the entertainment console by operations performed by or at one or more of the following block(s).

At block 3201, the process performs transmitting gaming control messages via the low latency transmitter, wherein the low latency transmitter is a 2.4 GHz transmitter having a maximum range of 10 meters and a latency of less than 10 milliseconds. In other embodiments, other ranges or latencies are contemplated. In general, any latency that provides for an interactive, real-time gaming experience may be acceptable, such as less than 5 ms, less than 10 ms, less than 15 ms, or the like. Because the mobile telephone is typically in the same room as the entertainment console, low range transmitters may be used, providing the additional benefit of low power consumption.

At block 3202, the process performs receiving gaming data via the high latency transceiver, wherein the high latency transceiver communicates using IP packets via a Wi-Fi or cellular network. The IP communication may be via a private (e.g., a VPN or a restricted LAN) or open network (e.g., an open Wi-Fi network or the Internet).

Figure 33:
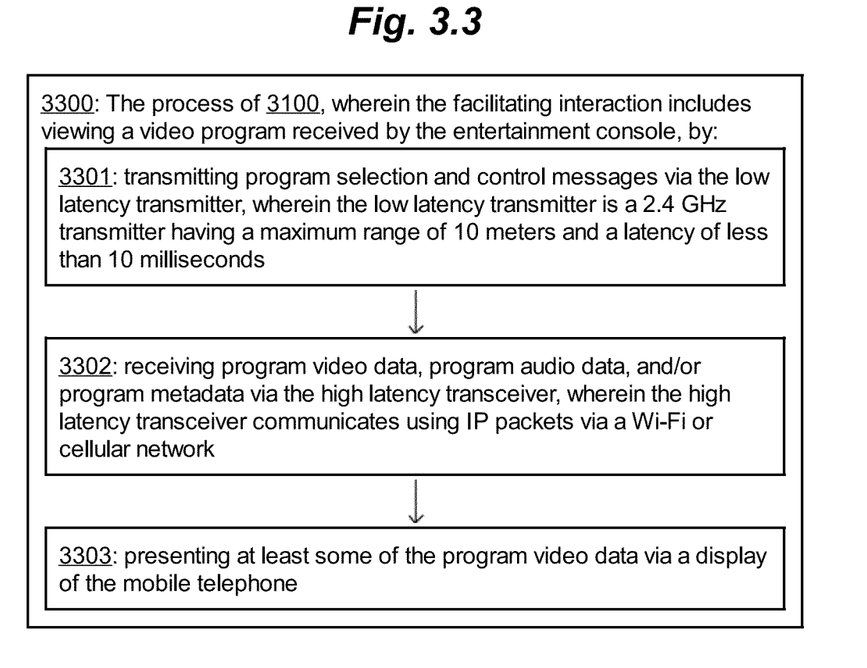

FIG. 3.3 is an example flow diagram of example logic illustrating an example embodiment of process 3100 of FIG. 3.1. More particularly, FIG. 3.3 illustrates a process 3300 that includes the process 3100, wherein the facilitating interaction includes viewing a video program received by the entertainment console, by operations performed by or at one or more of the following block(s).

At block 3301, the process performs transmitting program selection and control messages via the low latency transmitter, wherein the low latency transmitter is a 2.4 GHz transmitter having a maximum range of 10 meters and a latency of less than 10 milliseconds. As noted above, various ranges and/or latencies are contemplated. In general, somewhat higher latencies may be acceptable for video program viewing. However, even in the video program context, relatively low latency (e.g., less than 30 ms, less than 40 ms) may be desirable to reduce the delay perceived by users who are channel surfing or interacting with an electronic program guide or similar interface.

At block 3302, the process performs receiving program video data, program audio data, and/or program metadata via the high latency transceiver, wherein the high latency transceiver communicates using IP packets via a Wi-Fi or cellular network. As noted, IP communication may be via a private (e.g., a VPN or a restricted LAN) or open network (e.g., an open Wi-Fi network or the Internet).

At block 3303, the process performs presenting at least some of the program video data via a display of the mobile telephone. In addition, or otherwise, the display of the mobile telephone may be used to present metadata about the program, such as program information (e.g., actors, program summary, program schedule information), electronic program guides, or the like. For example, data for communication may be associated with a priority (e.g., 1, 2, 3) that may be used by the process to determine which communication connection to utilize.

Figure 34:
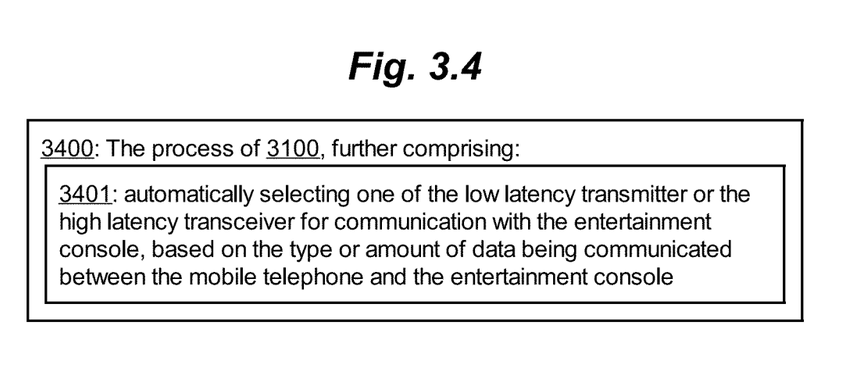

FIG. 3.4 is an example flow diagram of example logic illustrating an example embodiment of process 3100 of FIG. 3.1. More particularly, FIG. 3.4 illustrates a process 3400 that includes the process 3100, and which further includes operations performed by or at the following block(s).

At block 3401, the process performs automatically selecting one of the low latency transmitter or the high latency transceiver for communication with the entertainment console, based on the type or amount of data being communicated between the mobile telephone and the entertainment console. In some embodiments, the process automatically decides whether to use the low latency transmitter or the high latency transceiver based on the type or amount of data to be communicated (or already being communicated). For example, the process may preferentially use the low latency transmitter until that connection is saturated. In other embodiments, the data being communicated is tagged or otherwise identified as being preferentially transmitted via one or the other communication connection.

Figure 35:
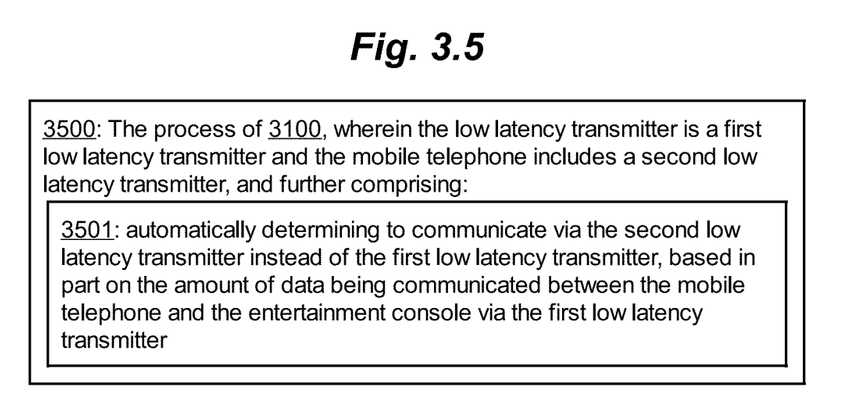

FIG. 3.5 is an example flow diagram of example logic illustrating an example embodiment of process 3100 of FIG. 3.1. More particularly, FIG. 3.5 illustrates a process 3500 that includes the process 3100, wherein the low latency transmitter is a first low latency transmitter and the mobile telephone includes a second low latency transmitter, and which further includes operations performed by or at the following block(s).

At block 3501, the process performs automatically determining to communicate via the second low latency transmitter instead of the first low latency transmitter, based in part on the amount of data being communicated between the mobile telephone and the entertainment console via the first low latency transmitter. In some embodiments, the mobile telephone includes multiple low latency transmitters that may transmit using different protocols and/or frequencies. For example, the mobile telephone may include a Bluetooth 2.4 GHz transceiver as well as a 2.4 GHz game controller transmitter (or transceiver). As another example, the mobile telephone may include a Bluetooth transceiver as well as an infrared transmitter. In some embodiments, the mobile telephone may transmit control signals or other data using the first low latency transmitter until that transmitter has reached (or is near) capacity (e.g., bandwidth), at which point the mobile telephone may use the second low latency transmitter for overflow. In other embodiments, the mobile telephone may attempt to substantially balance the amount of data being transmitted via the two transmitters. As another example, an application or other logic that is initiating the transmission may explicitly request to use one or the other of the low latency transmitters.

Example Computing System Implementation

Figure 4:
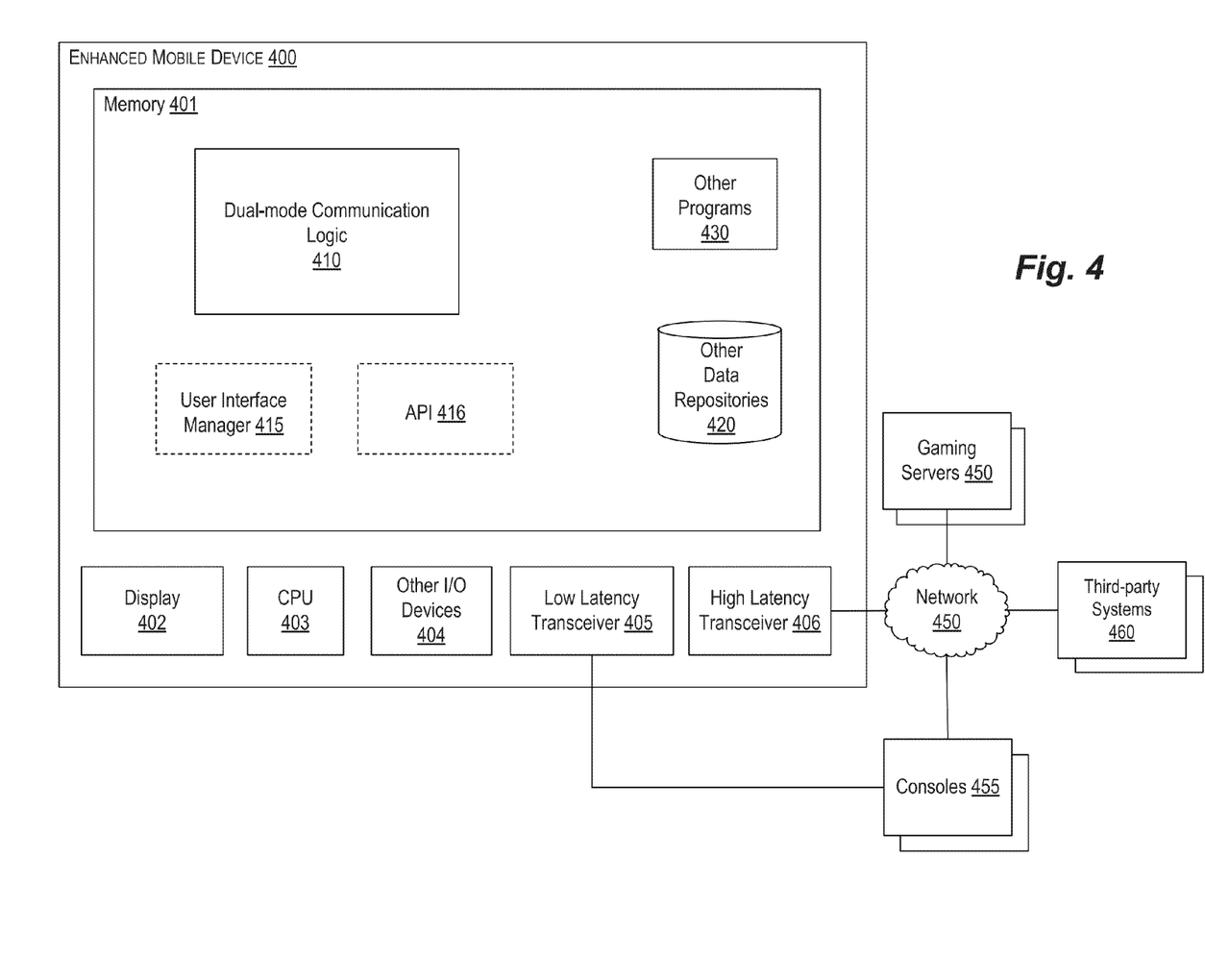
FIG. 4 is an example block diagram of an example computing system for implementing example embodiments.

FIG. 4 is an example block diagram of an example computing system for implementing example embodiments. In particular, FIG. 4 shows an enhanced mobile device 400 that may be utilized as the enhanced mobile device described with respect to FIG. 1.

In the embodiment shown, mobile device 400 comprises a computer memory ("memory") 401, a display 402, one or more Central Processing Units ("CPU") 403, Input/Output devices 404 (e.g., keyboard, touch screen, GPS receiver, accelerometer, position sensor, and the like), a low latency transceiver 405, and high latency transceiver 406. Dual-mode communication logic 410 is shown residing in memory 401. In other embodiments, some portion of the contents, some or all of the components of the logic 410 may be stored on and/or transmitted over the other computer-readable media 405. The logic 410 and any related components preferably execute on one or more CPUs 403 to perform the techniques or functions described herein. Other code or programs 430 (e.g., gaming apps, video streaming apps, and the like) and potentially other data repositories, such as data repository 420, also reside in the memory 401, and preferably execute on one or more CPUs 403. Note that one or more of the components in FIG. 4 may not be present in any specific implementation.

The mobile device 400 interacts with the consoles 455 (e.g., gaming consoles, set-top boxes) via the low latency transceiver 405 and via the high latency transceiver 406. In the illustrated embodiment, the communication via the low latency transceiver 405 is direct. In other words, it does not pass through any intermediate systems or devices. In contrast, the communication via the high latency transceiver 406 is indirect, in that it passes through the network 450. Note also that in some embodiments, the device 400 may not be capable of receiving data via a low latency connection. In such cases, the device 400 would have a transmitter in place of the low latency the low latency transceiver 405. Furthermore, the device 400 may also or instead have one or more low latency connections to the consoles 455 via a wired connection, such as a USB cable. Note that while consoles are sometimes used as examples, the functions of a console may equivalently be incorporated or implemented within a different form factor, such as within a smart television, an all-home entertainment system, a distributed system, or the like.

The network 450 may be or include the Internet and/or any networks used to provide IP-based communication, such as a network based on Wi-Fi, Wi-Di, WiMAX, 3G, 4G, or the like. Wi-Fi may be based on standards such as IEEE 802.11b, 802.11g, 802.11n over 2.4 GHz, 3.6 GHz, 5 GHz, or other frequencies. Wi-Di may be or include WirelessHD protocols. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

The mobile device 400 may also interact with gaming servers 450 and third-party systems/applications 460. The gaming servers 450 may include servers or systems that are used to facilitate group or shared gaming. The third-party systems 460 may include servers or systems used for content distribution (e.g., media streaming servers, online music stores, Web servers), application distribution (e.g., app stores), or the like.

The logic 410 is shown executing in the memory 401 of the mobile device 400. Also included in the memory are a user interface manager 415 and an application program interface ("API") 416. The user interface manager 415 and the API 416 are drawn in dashed lines to indicate that in other embodiments, functions performed by one or more of these components may be performed externally to the logic 410.

The logic 410 performs functions described herein. For example, the logic 410 may format data for communication via the transceivers 405 and 406. As another example, the logic 410 may automatically determine which of the transceivers 405 and 406 to utilize, based on information about the data being transmitted (e.g., type, amount, priority), information about the communication medium (e.g., whether the link is saturated or not, link utilization level), information about the receiver (e.g., requirements of the console 455), or the like.

The UI manager 415 provides a view and a controller that facilitate user interaction with the logic 410 and its various components. For example, the UI manager 415 may provide interactive access to the logic 410, so that uses can configure the operation of the dual-mode communication capability of the mobile device 400.

The API 416 provides programmatic access to one or more functions of the logic 410. For example, the API 416 may provide a programmatic interface to one or more functions of the logic 410 that may be invoked by one of the other programs 430 or some other module. In this manner, the API 416 facilitates the development of third-party software, such as user interfaces, plug-ins, adapters (e.g., for integrating functions of the logic 410 into mobile applications), and the like.

In addition, the API 416 may be in at least some embodiments invoked or otherwise accessed via remote entities, the gaming servers 450, the consoles 455, and/or the third-party systems/applications 460, to access various functions of the logic 410. For example, the console 455 may select a preferred communication frequency or channel (or set other parameters) with respect to the low latency transceiver 405 via the API 416.

In an example embodiment, components/modules of the logic 410 are implemented using standard programming techniques. For example, the logic 410 may be implemented as a "native" executable running on the CPU 403, along with one or more static or dynamic libraries. In other embodiments, the logic 410 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic. NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the logic 410, such as in the data store 420, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the logic 410 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. Patent Application No. 61/667,261, filed on Jul. 2, 2012 and entitled "DUAL-MODE COMMUNICATION DEVICES AND METHODS FOR COMMUNICATING WITH AN ENTERTAINMENT SYSTEM;" U.S. Patent Application No. 61/675,211, filed on Jul. 24, 2012 and entitled "DUAL-MODE COMMUNICATION DEVICES AND METHODS FOR ARENA GAMING;" and U.S. Patent Application No. 61/682,668, filed on Aug. 13, 2012 and entitled "DUAL-MODE EYEGLASSES;" are incorporated herein by reference, in their entireties. This application is also related by subject matter to U.S. patent application Ser. No. 13/934,039 filed on the same day as this Application, and to U.S. patent application Ser. No. 13/934,041 also filed on the same day as this Application, both of which are incorporated herein by reference.

From the foregoing it will be appreciated that, although specific embodiments have been described herein for purposes of illustration, various modifications may be made without deviating from the spirit and scope of this disclosure. For example, the methods, techniques, and systems for dual-mode communication are applicable to other architectures or in other settings. For example, at least some of the techniques may be employed in an educational setting, so that a classroom of students may interact with a teacher and/or educational system in a classroom or distributed setting. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A system for home entertainment, the system comprising:
a mobile device including a low latency transceiver that is communicatively coupled to an entertainment console, a high latency transceiver that is communicatively coupled to the entertainment console, and a module that is configured to:
transmit control messages to the entertainment console via the low latency transceiver, wherein the low latency transceiver is a 2.4 GHz frequency transceiver or a Bluetooth transceiver; and communicate data messages with the entertainment console via the high latency transceiver, wherein the data messages communicate at least one of game data, image data, video data, and audio data, wherein the high latency transceiver communicates via a Wi-Fi or cellular network using IP packets, and wherein at least some of the data messages are communicated via the high latency transceiver at the same time as at least some of the control messages are transmitted via the log latency transceiver.

2. The system of claim 1, wherein the mobile device and the entertainment console are located proximate to one another.

3. The system of claim 2, wherein the mobile device and the entertainment console are located within 10 meters of one another.

4. The system of claim 2, wherein the entertainment console is a gaming console communicatively coupled to a display, and wherein the mobile device communicates gaming control signals to the entertainment console via the low latency transceiver.

5. The system of claim 2, wherein the entertainment console is a set-top box communicatively coupled to a display and configured to present video programs on the display, and wherein the mobile device communicates set-top box control signals to the entertainment console via the low latency transceiver.

6. The system of claim 1, wherein the low latency transceiver is a 2.4 gigahertz frequency transmitter with a latency of less than 10 milliseconds.

7. The system of claim 1, wherein the low latency transceiver is a Bluetooth transceiver.

8. The system of claim 1, wherein the low latency transceiver has a maximum range of about 10 meters.

9. The system of claim 1, wherein the high latency transceiver communicates with the console via IP communication.

10. The system of claim 1, wherein the high latency transceiver communicates via at least one of a Wi-Fi connection, a 3G connection, a 4G connection, and/or an LTE connection.

11. The system of claim 1, wherein the mobile device does not include a low latency receiver for receiving data from the entertainment console.

12. The system of claim 1, wherein the system includes the entertainment console.

13. A method for interacting with an entertainment console, the method comprising:
facilitating interaction with the entertainment console by a mobile device that includes a low latency transmitter-transceiver communicatively coupled to the entertainment console and a high latency transceiver communicatively coupled to the entertainment console, by:
transmitting control messages to the entertainment console via the low latency transceiver, wherein the low latency transceiver is a 2.4 GHz frequency transceiver or a Bluetooth transceiver; and
communicating data messages with the entertainment console via the high latency transceiver, wherein the data messages communicate at least one of game data, image data, video data, and audio data, wherein the high latency transceiver communicates via a Wi-Fi or cellular network using IP packets, and wherein at least some of the data messages are communicated via the high latency transceiver at the same time as at least some of the control messages are transmitted via the low latency transceiver.

14. The method of claim 13, wherein the facilitating interaction includes playing an interactive video game executing on the entertainment console by:
transmitting gaming control messages via the low latency transceiver, wherein the low latency transceiver has a maximum range of 10 meters and a latency of less than 10 milliseconds; and
receiving gaming data via the high latency transceiver, wherein the high latency transceiver communicates using IP packets via the Wi-Fi or the cellular network.

15. The method of claim 13, wherein the facilitating interaction includes viewing a video program received by the entertainment console, by:
transmitting program selection and control messages via the low latency transceiver, wherein the low latency transceiver has a latency of less than 10 milliseconds;
receiving program video data, program audio data, and/or program metadata via the high latency transceiver, wherein the high latency transceiver communicates using IP packets; and
presenting at least some of the program video data via a display of the mobile device.

16. The method of claim 13, further comprising:
automatically selecting one of the low latency transceiver or the high latency transceiver for communication with the entertainment console, based on the type or amount of data being communicated between the mobile device and the entertainment console.

17. The method of claim 13, wherein the low latency transceiver is a first low latency transceiver and the mobile device includes a second low latency transceiver, and further comprising:
automatically determining to communicate via the second low latency transceiver instead of the first low latency transceiver, based in part on the amount of data being communicated between the mobile device and the entertainment console via the first low latency transceiver.

18. The method of claim 13, wherein the transmitting control messages to the entertainment console via the low latency transceiver includes: transmitting gaming control signals via the low latency transceiver.

19. The method of claim 13, wherein the transmitting control messages to the entertainment console via the low latency transceiver includes: transmitting control messages via an infrared communication module of the mobile device.

20. The method of claim 13, wherein the transmitting control messages to the entertainment console via the low latency transceiver includes: transmitting control messages via the 2.4 gigahertz frequency communication transceiver of the mobile device.

21. The method of claim 13, wherein the transmitting control messages to the entertainment console via the low latency transceiver includes: transmitting control messages via a communication connection that has a latency of less than 15 milliseconds.

22. The method of claim 13, wherein the communicating data messages with the entertainment console via the high latency transceiver includes: receiving data messages from the entertainment console via IP communication.

23. The method of claim 13, wherein the communicating data messages with the entertainment console via the high latency transceiver includes: receiving data messages from the entertainment console via the Internet.

24. The method of claim 13, wherein the communicating data messages with the entertainment console via the high latency transceiver includes: receiving data messages from the entertainment console via at least one of a Wi-Fi connection, a 3G connection, a 4G connection, and/or an LTE connection.

25. The method of claim 13, wherein the mobile device is a smart phone or a tablet computer having a cellular communication module as the high latency transceiver and a 2.4 gigahertz frequency transceiver as the low latency transceiver.

26. A non-transitory computer-readable medium including contents that are configured, when executed, to cause a computing system to perform a method for interacting with an entertainment console, the method comprising:

facilitating interaction with the entertainment console by a mobile device that includes a low latency transceiver communicatively coupled to the entertainment console and a high latency transceiver communicatively coupled to the entertainment console, by:

transmitting control messages to the entertainment console via the low latency transceiver, wherein the low latency transceiver is a 2.4 GHz frequency transceiver or a Bluetooth transceiver; and         communicating data messages with the entertainment console via the high latency transceiver, wherein the data messages communicate at least one of game data, image data, video data, and audio data, wherein the high latency transceiver communicates via a Wi-Fi or cellular network using IP packets, and wherein at least some of the data messages are communicated via the high latency transceiver at the same time as at least some of the control messages are transmitted via the low latency transceiver.

27. The note-transitory computer-readable medium of claim 26, wherein the computer-readable medium is a memory in a mobile device.

28. The non-transitory computer-readable medium of claim 26, wherein the contents are instructions that, when executed, cause the computing system to perform the method.

* * * * *